Patented Feb. 9, 1943

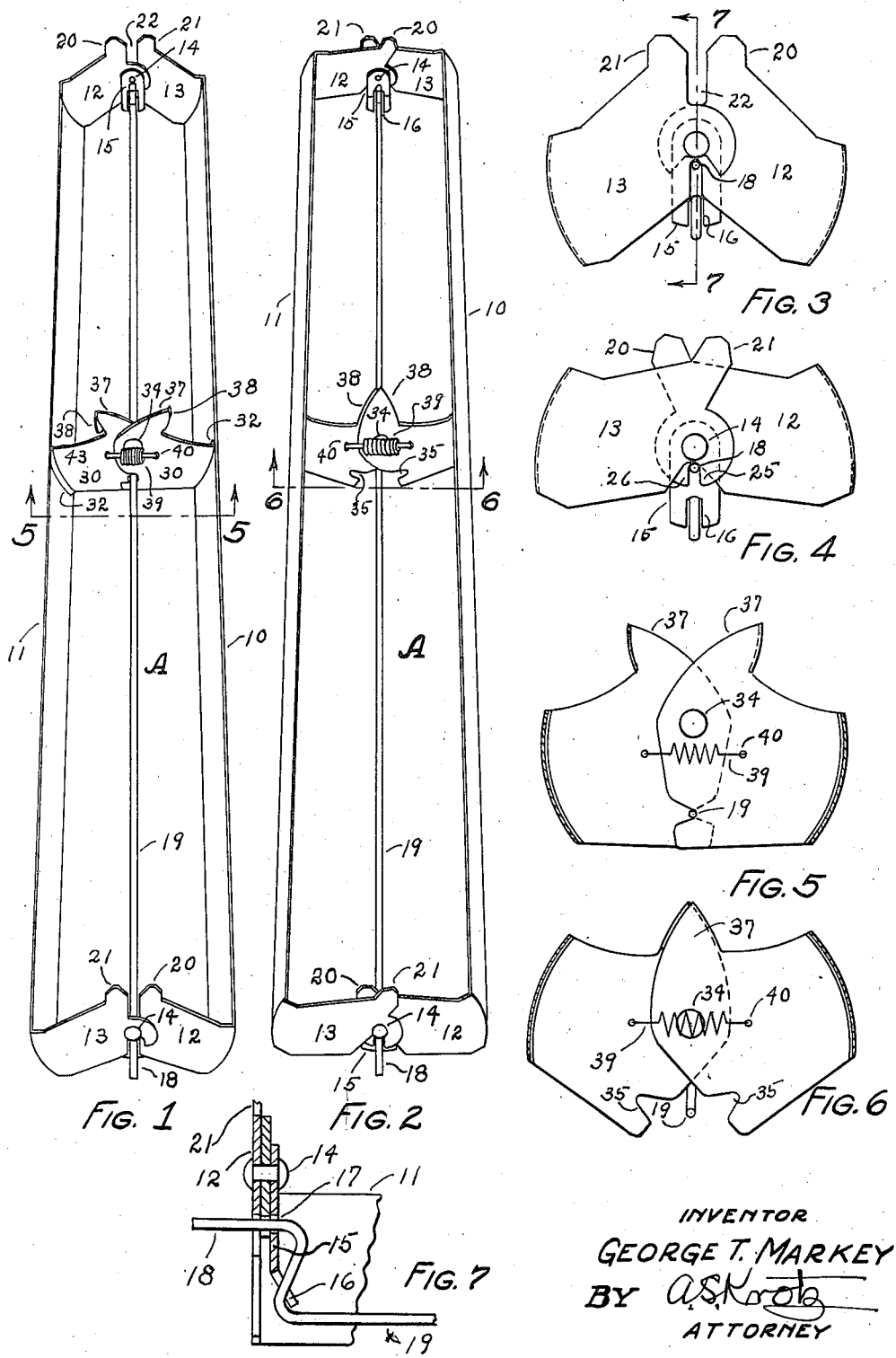

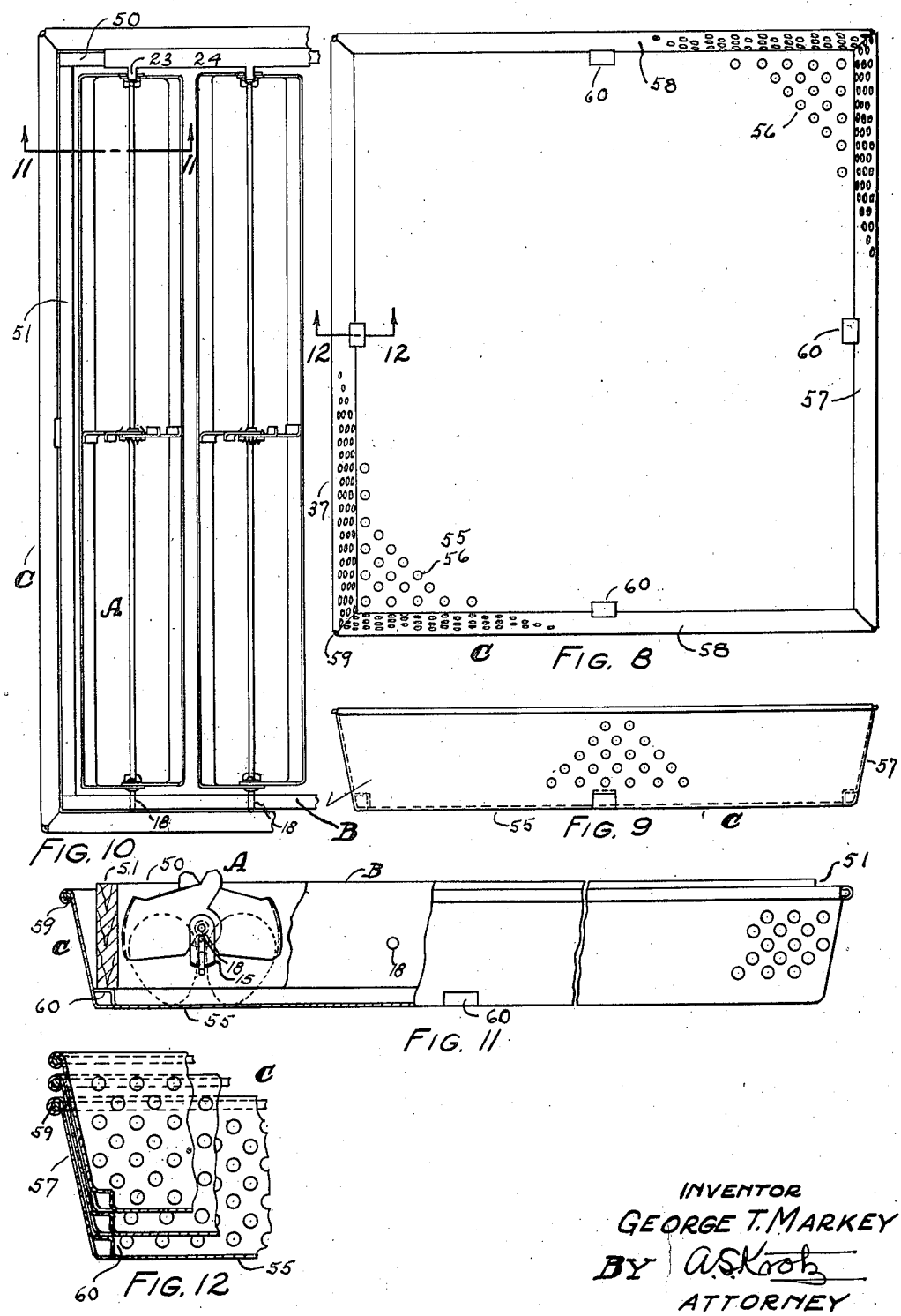

2,310,534

UNITED STATES PATENT OFFICE 2,310,534

INCUBATING AND HATCHING TRAY AND CAGE

George T. Markey, Fort Atkinson, Wis., assignor to James Manufacturing Company, Fort Atkinson, Wis., a company of Wisconsin Application August 16, 1940, Serial No. 352,875

7 Claims. (Cl. 119—43)

The present invention relates to cages and incubating trays therefor and hatching trays adapted to receive the incubating trays and the eggs therefrom without handling and may be considered an improvement over my copending application Serial No. 258,353, filed February 25, 1939. This application has become Patent 2,267,473, December 23, 1941.

The principal object of the present invention is to provide an incubating tray having cages adapted to release the eggs therein downwardly by simply pressing together two spaced hand pieces and the hatching trays being adapted to receive the incubating trays so the eggs are held close to the bottom of the hatching tray before being released, making it possible to release the eggs directly into the hatching trays, after which the incubating tray and its cages may be removed from the hatching tray.

One of the objects of present invention is to provide an egg tray which will release the eggs downwardly far enough so the eggs will not be lifted when the incubating tray is removed from the hatching tray.

The cages are provided with a spring which is adapted to return the cages to their normal holding position, after their tray is lifted from the hatching tray.

A further object of the present invention is to provide an incubating tray having permanently hingedly secured therein egg cages which, when in their normal position, may be conveniently and quickly filled with eggs and the cages locked in this position by the cage shifting device.

A still further object of the present invention is to provide incubating and hatching trays adapted for quick transfer of the eggs from the incubating trays to the hatching trays, whereby when an incubating tray is removed from the cabinet, a hatching tray, to which the eggs have been transferred, may be immediately returned to the position formerly occupied by the incubating tray, thus to expose the eggs to the outside atmosphere for a minimum length of time.

Another object of the present invention is to provide incubating trays adapted to be placed in a cabinet for incubation and hatching trays adapted to replace the incubating trays or to be placed in a separate compartment in the cabinet for hatching, in a manner as described in my copending application Ser. No. 255,634, filed February 10, 1939. This application has become Patent 2,267,244, December 23, 1941.

A further object of my invention is to provide incubating and hatching trays suitable for use in a cabinet as shown and described in my copending application Ser. No. 303,748, filed November 10, 1939.

One of the difficulties in operating devices as illustrated in the next above referred to pending application is the time required for transferring the eggs from one tray to the other. In my present application, the eggs from the incubating trays may be almost instantly transferred to the hatching trays and after being so transferred, the cages or cradles in the incubating trays are designed to be held in the most convenient position for refilling. Furthermore, a greater range of egg sizes and a larger number of larger eggs may be placed in the cages and released because of the shape of the cages.

To these and other useful ends, my invention consists of parts, combinations of parts, or their equivalents, and mode of operation, as hereinafter set forth and claimed and shown in the accompanying drawings in which:

Fig. 1 is a perspective view from above of my improved egg cage, when in its closed position, ready to receive fresh eggs.

Fig. 2 is a perspective view from above, of my improved egg cage, in a position to release the eggs downwardly from the cages.

Fig. 3 is an end view of the cage as illustrated in Figure 1.

Fig. 4 is an end view of the cage as illustrated in Figure 2.

Fig. 5 is a transverse section of the cage as illustrated in Figure 1, taken on line 5—5 of this figure.

Fig. 6 is a transverse sectional view of the cage as illustrated in Figure 2, and taken on line 6—6 of this figure.

Fig. 7 is a fractional detail longitudinal section of a cage taken on line 7—7 of Figure 3.

Fig. 8 is a top view of my improved hatching tray.

Fig. 9 is an end view of the hatching tray as illustrated in Figure 8.

Fig. 10 is a fractional top view of an incubating and a hatching tray, showing two egg cages in the position illustrated in Figure 1, and the incubating tray positioned in the hatching tray, as illustrated in Figure 11.

Fig. 11 is an end view of an incubating and hatching tray having a fraction of the trays removed so as to illustrate an egg cage after the eggs have been released and illustrating the eggs after they have dropped to the bottom of the hatching tray.

Fig. 12 is a fractional view of three hatching trays taken in section so as to illustrate the position of the trays when stacked, one within the other.

As thus illustrated, the cages are designated in their entirety by reference character A. The incubating tray is designated in its entirety by reference character B and the hatching tray is designated in its entirety by reference character C.

The cages each comprise side members 10 and 11. These members are provided with inturned ends 12 and 13. It will be noted that members 10, 11, 12 and 13 are duplicates and are turned end for end and hingedly riveted together as at 14—14; the rivets forming hinges which also pass through the upper ends of members 15—15, the rivets being adapted to permit free movement of members 12, 13 and 15.

Members 15 are slotted at their bottoms as at 16 and have an opening as at 17 for the cranked end 18 of anchor bar 19. The vertical ends of bars 19 extend through slots 16, as clearly illustrated in the various figures, particularly in Figure 7. Thus it will be seen that bar 19 is hingedly mounted, as at 14, members 18 being a slight distance below hinges 14 and being long enough to extend into openings in the incubating tray so member A will be hingedly mounted (see dotted line in Figure 10 and see Figure 11).

Members 12 and 13 are cut-away so when they are in the position shown in Figure 1, they will embrace members 18, thus member 19 will be held from swinging when the cage is in the position shown in Figure 1. It will therefore answer as a positioner for two rows of eggs when positioned in the cage, the eggs being held somewhat above the position shown in Figure 11, depending to some extent on the size of the eggs. The plan however is to have the bottom of the eggs slightly above the bottom of the hatching tray before being released.

It will be noted by observing Figures 1 and 3, that when the cage is in position to receive eggs, member 19 is held against side swinging and that when in the position for releasing the eggs, as illustrated in Figure 6 this member is free to swing sidewise to assist in releasing the eggs and allowing them to pass downwardly from the cage.

Members 12 and 13 are provided with upwardly extending portions 20 and 21 which are spaced apart as at 22, when the side members are in the position shown in Figures 1 and 3, thus to provide an opening for the reception of the shifting pins 23 similar to the shifting pins 28, clearly shown with their operating parts in Patent 1,796,872, March 17, 1931, Markey. These shifting pins are carried by a shifting bar 24 having a single projection positioned (not shown) to be acted upon by a unitary shifting device which extends to the outside of the housing. It will be seen that the trays filled with eggs and in position for incubation, will be locked by pins 23 and the trays may be rocked back and forth by member 24 on the cage hinges 18. Thus when it is desired to release the eggs in the incubating trays, it will be necessary only to lift member 24 from the tray so as to unlock the cages.

I provide a connection between members 10 and 11 midway their length in the form of brackets 30 the brackets having flanges 32 which are preferably spot welded to members 10 and 11. These brackets are hingedly secured together by a rivet 34 so the side members will be permitted to move, as already described.

Members 30 are provided with cut-away openings 35. These openings are adapted to embrace member 19, as illustrated in Figure 1, when the cage is in position to receive eggs. Thus member 19 is held from swinging sidewise at its center as well as at its ends, and the center will be held from bending downwardly from the weight of the eggs.

Members 30 are provided with upwardly extending hand pieces 37 37, each having small right angle bends 38. When the cage is in the position to receive the eggs, members 38 are spaced a distance apart, as illustrated in Figure 1, and when it is desired to release the eggs in a cage, all that is necessary is to grip members 38 with the thumb and forefinger and press them together, as illustrated in Figure 2.

I provide a spring 39, the ends of which are hooked into members 30 as at 40. These connections are preferably slightly below the horizontal plane of member 34 when members 10 and 11 are in the position shown in Figures 2, 4 and 6. As illustrated in Figures 1, 3 and 5, the spring will exert a pressure sufficient to hold the eggs into position in the trays and until member 23 is in position, after which members 10 and 11 are locked into position.

It will be seen by scrutinizing Figures 1 to 7 inclusive, that I have provided a very simple egg cage which can be manufactured at low cost, having a minimum number of joints and sharp corners for the accumulation of dirt and therefore it can be easily cleaned and disinfected.

Trays B as is the custom, comprise end members 50—50 and side members 51—51. Hatching tray C is preferably formed from a single sheet of steel, having a bottom member 55 with closely spaced apertures 56 and upturned side and end members 57 and 58. These side and end members converge downwardly as illustrated, and have their upper edges folded around a wire 59, the wire being bent at the corners, as illustrated, so as to hold the side and end members together at these points.

Members 57 and 58 have preferably spaced apertures similar to the apertures in member 55. It will be seen that members C are adapted to be stacked one above the other, as illustrated in Figure 12. In order to provide a stop rest for these stacked members and a rest for trays B, when placed into trays C, I provide preferably four projections 60, the edges being cut free and the body of the cut free portions being bent inwardly, as illustrated, and having the proper height for stacking trays C and for receiving and holding trays B in the proper position so the eggs will be dropped slightly when released, as illustrated in Figure 11.

In devices of the kind, if a single cabinet is used and the cabinet is filled with say ten incubating trays B during a period of 19 days of incubation, trays C may be stacked, as illustrated in Figure 12. Thus considerable time and room are saved and a comparatively small disinfecting vat will hold a large number of my improved hatching trays when stacked and the disinfecting done by boiling or treated solutions.

An advantage of the design of my hatching trays is that if one should have say ten cabinets, each having a capacity of say twenty trays, it would be quite a problem to store enough trays C previous to their use. However, in my design, clearly the problem will be simplified. Furthermore, in view of the fact that it requires 19 days for incubation and not over two or three days for hatching, one would need only enough trays C so there are always a few hatching trays ready to receive the eggs which are ready to be hatched. In any event, the design of the cages and trays clearly simplifies the handling of the eggs and trays. Furthermore, it will be seen that my incubating and hatching trays clearly simplify the attention required for transferring the eggs from one tray to another and for disinfecting the trays.

Clearly many minor detail changes may be made without departing from the spirit and scope of the present invention, as recited in the appended claims.

Having thus shown and described my invention, I claim:

1. An egg case of the class described, comprising two side members having overlapping end members which are hingedly connected together and having a center bar positioned whereby when the side members are in their operating position, means are provided for the reception of two rows of eggs, longitudinally central brackets hinged together similarly to said end members and having normally spaced apart upwardly projecting portions and a spring adapted to yieldingly hold the side members in operating position and whereby by manually pressing said projections together, said side members at their lower edges will be moved apart and the eggs released downwardly.

2. A device as recited in claim 1 including; said central brackets having hooks which engage said center bar and firmly hold it in position when said side members are in operating position.

3. An egg cage of the class described, comprising two side members having overlapping end members which are hingedly connected together and having a center bar with upwardly extending cranked ends, each being supported on a plate which is hingedly connected to said first hinge, the outwardly projecting portions of said bar being adapted to act as hinged supports for the cage, and means whereby when said side members are in operating position, said bar will be locked from swinging on said hinges.

4. A device as recited in claim 3 including; medially positioned brackets forming a hinged connection between said side members similar to the hinged connections at the ends thereof and having means to support and hold said bar in its center position when said side members are in their operating position.

5. An egg cage of the class described, comprising two side members having overlapping end members which are hingedly connected together and having a center bar positioned whereby when the side members are in their operating position, means are provided for the reception of two rows of eggs, center brackets being hingedly connected together forming a connection between said side members similar to the connection between their ends, and spaced upwardly extending portions on said end members adapted for the reception of an oscillating member, and for holding said side members in their operating position and to act to rock said cage in opposite directions.

6. A device of the class described, comprising an incubating tray, a number of parallel egg cages pivotally supported in said tray in spaced transverse relation, said egg cages each comprising two side members having overlapping end members which are hingedly connected together and having a center bar positioned whereby when the side members are in their operating position, means are provided for the reception of two rows of eggs, longitudinally central brackets hingedly connected together and forming a spacing means for said side members similar to said end members, a spring on said central brackets adapted to yieldingly hold said side members in their operating positions, and upwardly extending spaced extensions on said central brackets providing means whereby by manually pressing said projections together, said side members at their lower edges will be moved apart and the eggs released downwardly.

7. A device of the class described, comprising an incubating and a hatching tray, said incubating tray having a number of spaced egg holding cages each having a center supporting rod and side holding means, said side holding means being pivoted together and having a spring being adapted to hold the side members in position to cooperate with said rods for holding two rows of eggs, means in said hatching tray whereby said incubating tray may be placed in the hatching tray with the bottoms of the eggs held a short distance from the bottom of the hatching tray and means on said side holding means whereby the eggs in individual cages may be manually released downwardly far enough so they will rest on the bottom of the hatching tray before being out of yielding contact with said side holding means, whereby when said incubating tray is lifted, the eggs will be fully released and the side holding means will return automatically to their egg holding position, said means in the hatching tray being adapted to act as a rest when another hatching tray is stacked therein.

GEORGE T. MARKEY.

CERTIFICATE OF CORRECTION.

Patent No. 2,310,534. February 9, 1943.

GEORGE T. MARKEY.

It is hereby certified that error appears in the printed specification of the above numbered patent requiring correction as follows: Page 2, first column, lines 62 and 64, for "trays" read --cages--; page 3, first column, line 17, claim 1, for "case" read --cage--; and that the said Letters Patent should be read with this correction therein that the same may conform to the record of the case in the Patent Office.

Signed and sealed this 16th day of March, A. D. 1943.

(Seal)
Henry Van Arsdale,
Acting Commissioner of Patents.